R. G. FALCONER.
TIRE PROTECTOR.
APPLICATION FILED MAR. 3, 1916.
1,192,291.
Patented July 25, 1916.
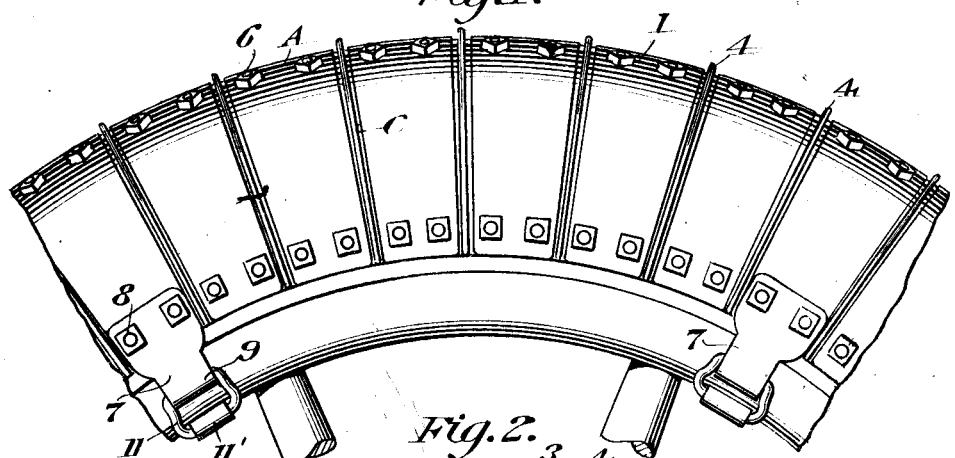
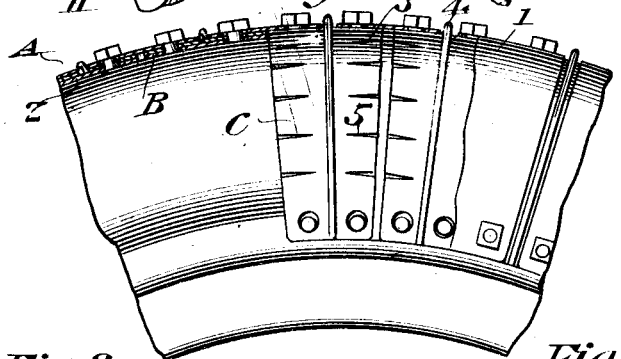
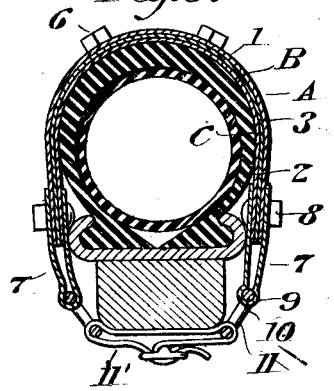
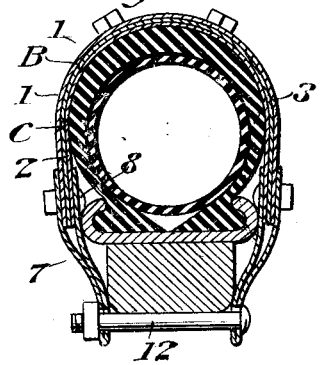
Inventor
R. G. Falconer
By Victor J. Evans
Attorney
Witnesses

UNITED STATES PATENT OFFICE.

ROSWELL G. FALCONER, OF LITCHFIELD, OHIO.

TIRE-PROTECTOR.

1,192,291.  Specification of Letters Patent.  Patented July 25, 1916.

Application filed March 3, 1916. Serial No. 81,968.

*To all whom it may concern:*

Be it known that I, ROSWELL G. FALCONER, a citizen of the United States, residing at Litchfield, in the county of Medina and State of Ohio, have invented new and useful Improvements in Tire-Protectors, of which the following is a specification.

This invention relates to tire protectors, the object in view being to produce a puncture- and blow out-proof protector or armor for pneumatic tires, the said protector being flexible throughout and formed, with the exception of the fastening means, entirely of metal, the body of the protector being composed of several series of plates or metallic sections having a novel arrangement with relation to each other for the purpose of admitting of the necessary resiliency while avoiding any possibility of punctures, the protector also forming an efficient support for a pneumatic tire which will prevent blow outs.

A further object in view is to so combine the parts or sections of the protector that they may be easily replaced when broken or injured so as to be unfit for further use.

With the above and other objects in view, the invention consists in the novel construction, combination and arrangement of parts, as herein described, illustrated and claimed.

In the accompanying drawings:—Figure 1 is a fragmentary side elevation illustrating a tire protector embodying the present invention. Fig. 2 is a similar view with parts broken away to show the inner and intermediate sections. Fig. 3 is a transverse section through a wheel rim and tire, showing the protector and fastening means therefor in accordance with the present invention. Fig. 4 is a detail view illustrating the use of bolts in place of straps for fastening the protector in place.

The tire protector contemplated in this invention comprises an outer series A of sheet metal sections, an inner series B of sheet metal sections and an intermediate series C of sheet metal sections.

Each of the sections 1 of the outer series is composed of a plate or strip of suitable length wider at the center than at the ends thereof so that when all the sections of the series are in their proper relation to each other, the adjacent edges of the sections lie substantially parallel to each other. Each of the inner sections 2 is formed in the same manner and likewise each of the intermediate sections 3. The inner and outer sections are arranged in overlapping relation to each other so as to break joint as illustrated in the drawings and allow for a certain relative movement of the inner and outer sections in the direction of length of the tire without leaving any gap between the edges through which a pointed object might reach the outer casing of the pneumatic tire in connection with which the protector as a whole is used. Each of the intermediate sections 3 is provided about centrally thereof and upon its outer face with a projecting rib 4 extending longitudinally of said section and transversely with relation to the protector as a whole, the said rib 4 lying between the adjacent edges of adjoining outer sections 1. Greater flexibility is provided for the intermediate sections as well as the protector as a whole by forming each intermediate section 3 with slits 5 extending transversely of the section as indicated in Fig. 2. The inner and outer and intermediate sections are connected where they overlap by means of bolts 6 or the equivalent thereof, the bolt holes being of sufficiently larger size than the bolts to allow of a certain amount of relative movement of the sections thus giving the required flexibility to the protector.

Secured to the marginal edges of the protector are sheet metal clips 7 fastened thereto by bolts 8 or their equivalent. Each clip is preferably formed from a single piece of sheet metal reduced in width at its center and bent about centrally and folded upon itself in such manner as to form a loop 9. This loop receives the bar 10 of a link 11 which, therefore, has a pivotal connection with the respective clip. The links are arranged opposite each other, 11 designating a strap passing through said links and adapted to pass around the inside of the felly for the purpose of securing the protector in place around the tire. In lieu of straps, bolts 12 may be inserted through the clips, said bolts resting against the inner face of the felly. Ordinarily, six or eight of such fastening devices are sufficient to secure the protector in its proper position and relation to the tire.

When the protector is in its applied position and relation to the tire, it presents an all metal surface with transversely extending ribs, these ribs together with the nuts or heads of the bolts obtaining a good tractive hold on the road surface. The portionlar function of the ribs above described is to prevent pointed articles such as nails and the like from becoming jammed under the edges of the outer sections 1 and finally working their way inwardly until they reach the pneumatic tire casing. The ribs also serve to properly position the outer sections in relation to each other during the assemblage of the sections of the protector and thereafter.

Having thus described my invention, I claim:—

A protector for pneumatic tires consisting of an annular flexible body comprising an inner circular series of sheet metal sections, an outer circular series of sheet metal sections which overlap and break joint with the outer sections, an intermediate circular series of sheet metal sections each formed on its outer face with a projecting rib extending lengthwise thereof and transversely of the protector body and lying between the adjacent edges of adjoining outer sections, all of the sections of the three series extending transversely of the tire, fasteners inserted through the overlapping portions of the several series of sections, and means for securing the protector as a whole in place upon a tire.

In testimony whereof I affix my signature in presence of two witnesses.

ROSWELL G. FALCONER.

Witnesses:
JOHN S. GOUGH,
DAVID P. SIMMONS.

Copies of this patent may be obtained for five cents each, by addressing the "Commissioner of Patents, Washington, D. C."